US012654639B2

(12) United States Patent
Papp et al.

(10) Patent No.: US 12,654,639 B2
(45) Date of Patent: Jun. 16, 2026

(54) AUTOMATED METHOD FOR SELECTING MUSIC IN A VEHICLE

(71) Applicant: Dr. Ing. h.c. F. Porsche Aktiengesellschaft, Stuttgart (DE)

(72) Inventors: Ethan Papp, Union City, CA (US); Stefan Leitner, Redwood City, CA (US)

(73) Assignee: Dr. Ing. h.c. F. Porche Aktiengesellschaft, Stuttgart (DE)

( * ) Notice: Subject to any disclaimer, the term of this patent is extended or adjusted under 35 U.S.C. 154(b) by 23 days.

(21) Appl. No.: 18/805,606

(22) Filed: Aug. 15, 2024

(65) Prior Publication Data

US 2026/0048712 A1     Feb. 19, 2026

(51) Int. Cl.
*B60R 16/037*     (2006.01)
*B60K 35/10*     (2024.01)
*B60K 35/26*     (2024.01)

(52) U.S. Cl.
CPC ............ *B60R 16/037* (2013.01); *B60K 35/10* (2024.01); *B60K 35/26* (2024.01)

(58) Field of Classification Search
CPC ........ B60R 16/037; B60K 35/26; B60K 35/10
See application file for complete search history.

(56) References Cited

U.S. PATENT DOCUMENTS

| | | | |
|---|---|---|---|
| 2011/0208750 A1* | 8/2011 | Miyazaki | G06F 16/907 707/E17.014 |
| 2016/0125076 A1* | 5/2016 | Jung | G06F 16/686 707/767 |
| 2020/0134671 A1* | 4/2020 | Maccini | H04W 12/30 |
| 2020/0191594 A1* | 6/2020 | Watanabe | G01C 21/3611 |
| 2020/0406752 A1* | 12/2020 | Ahn | G06V 40/28 |
| 2021/0274106 A1* | 9/2021 | Liu | G11B 27/036 |
| 2023/0141088 A1* | 5/2023 | Giovagnoni | H04N 21/233 725/34 |
| 2024/0200967 A1* | 6/2024 | Arroyo | G01C 21/3676 |

FOREIGN PATENT DOCUMENTS

| | | |
|---|---|---|
| CN | 116484046 A | 7/2023 |
| DE | 102020127433 A1 | 4/2022 |
| DE | 102022107293 A1 | 9/2023 |
| DE | 102022121930 A1 | 2/2024 |

* cited by examiner

*Primary Examiner* — Hussein Elchanti

(74) *Attorney, Agent, or Firm* — Buchanan Ingersoll & Rooney PC

(57)     ABSTRACT

A method and computer program product for automatically selecting songs to be played within a vehicle without user intervention during operation of the vehicle based on an environment or perceived mood of the user. A software application captures data encompassing (i) vehicle-related information including current vehicle speed, and (ii) user-related information including music preferences of the user of the vehicle. The software application transmits the data to an artificial intelligence (AI) program. The software application queries the AI program for a suggested song based on the data. The software application receives the suggested song from the AI program. The software application instructs a music player program to play the suggested song over a speaker system of the vehicle.

20 Claims, 1 Drawing Sheet

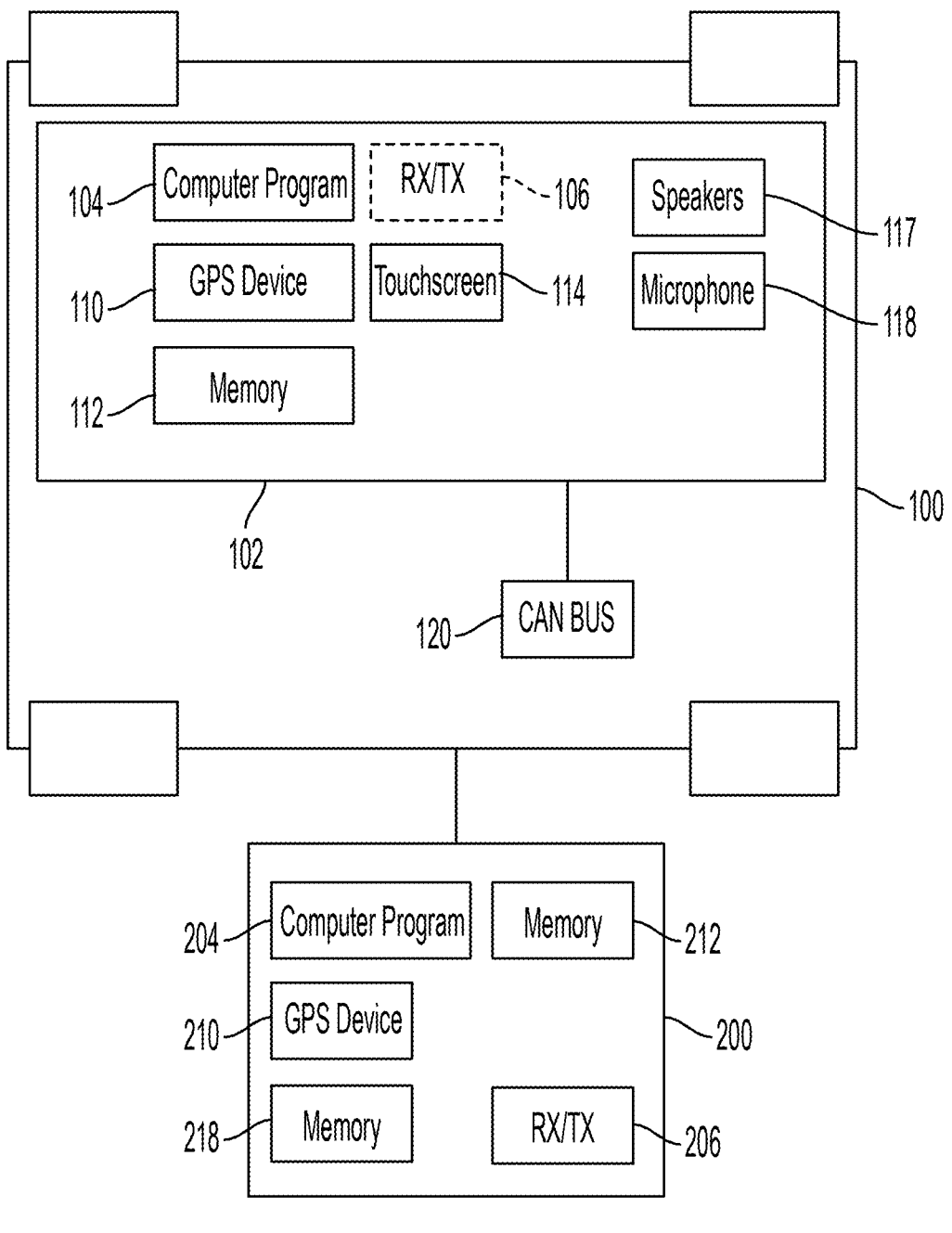

AUTOMATED METHOD FOR SELECTING MUSIC IN A VEHICLE

FIELD OF THE INVENTION

The present subject matter relates to a system and method for selecting music to be played within the passenger compartment of a vehicle based on vehicle-related data, user-related data and/or other data.

BACKGROUND OF THE INVENTION

Most vehicle drivers or passengers use a vehicle infotainment system or smartphone for playing music over the speakers of the vehicle. Vehicle infotainment systems may have original in-vehicle applications (apps) provided by the vehicle manufacturer or those systems can connect to a smartphone and then project (i.e., mirror) an app installed on the smartphone onto the vehicle display screen through Apple CarPlay, Android Auto, CarLife, or other software connectivity protocols. Such arrangements are described in U.S. patent application Ser. Nos. 18/444,856, 18/444,866 and 18/444,885, each of which is incorporated by reference in its entirety and for all purposes. The vehicle infotainment system can be interconnected with the in-vehicle network of controllers, sensors and computers. Similarly, a smartphone has its own network of controllers and sensors.

Described herein is a system which aims to capture an environment or mood of the driver (or user) and automatically control song selection played within the vehicle interior based on the environment or perceived mood of the user and without much effort or distraction from driving, thereby enhancing public safety. The environment or perceived mood of the user may be based on vehicle-related data, user-related data and/or other data.

SUMMARY OF INVENTION

Described herein are a method for automatically selecting songs to be played within a vehicle without user intervention during operation of the vehicle based on an environment or perceived mood of the user and a computer program product for carrying out the method. The method comprises the steps of: capturing data using a software application, said data including (i) vehicle-related information including current vehicle speed, and (ii) user-related information including music preferences of the user of the vehicle; transmitting, by the software application, said data to an artificial intelligence (AI) program; querying, by the software application, the AI program for a suggested song based on said data; receiving, by the software application, the suggested song from the AI program; and instructing, by the software application, a music player program to play the suggested song over a speaker system of the vehicle.

BRIEF DESCRIPTION OF THE DRAWINGS

The drawing FIGS. depict one or more implementations, by way of example only, not by way of limitations. In the figures, like reference numerals refer to the same or similar elements.

FIG. 1 depicts a schematic diagram of a vehicle and a mobile device connected to the vehicle.

DETAILED DESCRIPTION OF THE INVENTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

FIG. 1 depicts an exemplary vehicle 100 having a computerized infotainment system 102. An electronic mobile device 200 (otherwise referred to herein as a smartphone) is shown connected to vehicle infotainment system 102 via a wired or wireless connection (e.g., Wi-Fi, cellular or Bluetooth connection). Mobile device 200 does not necessarily form part of vehicle 100. Infotainment system 102 and/or electronic mobile device 200 are used either individually or in combination for carrying out the exemplary methods described herein. In other words, the method may be carried out in the absence of either one of the mobile device 200 or the system 102.

Turning now to the features of the infotainment system 102, system 102 is configured for controlling functions related to the operations of vehicle 100. Infotainment system 102 may generally include a computer processor for executing computer program 104, a receiver/transmitter (RX/TX) 106, a GPS device 110, a computer memory 112, a touchscreen or other visual display 114 having means for inputting data and/or displaying data, audio speakers 117, a microphone 118, a smartphone mirroring system app (e.g., CarPlay), navigation, telematics, internet access, etc. The functionality of program 104 can be enabled or disabled by user input on the touchscreen display 114 of vehicle infotainment system 102. Receiver/transmitter 106 may send and receive data via Bluetooth, Wi-Fi and/or 4G/LTE radios built into vehicle 100, by way of example. Receiver/transmitter 106 may be configured for communicating with (i) mobile device 200 in a conventional manner, and, optionally, (ii) an external server for accessing the Internet.

Mobile device 200 may be a conventional smartphone including a computer processor for executing computer program 204, a receiver/transmitter 206, a GPS device 210, a computer memory 212, a touchscreen, audio speakers, navigation, Internet, etc.

It is noted that vehicle 100 and electronic mobile device 200 are not necessarily limited to any one of the aforementioned components. For example, the infotainment system 102 could simply include a radio and speakers.

The exemplary methods described herein may be performed by either computer program 104 or computer program 204. Computer programs 104 and 204 are optionally in the form of a software application (e.g., "app") that is downloaded to, installed on, and stored in, infotainment system 102 of vehicle 100 and electronic mobile device 200, respectively. If, for example, infotainment system 102 includes program 104 and is capable of directly connecting to the Internet for receiving and/or transmitting information to/from the Internet, then mobile device 200 may be omitted. Alternatively, if infotainment system 102 is not capable of directly connecting to the Internet or does not include program 104, then the computer program 204 of mobile device 200 may be utilized for performing the exemplary methods described herein. As another alternative, computer programs 104 and 204 may be used in combination for performing the exemplary methods described herein. By way of example, program 104 may be used to collect vehicle-related data whereas program 204 may be used to collect other relevant data, and one of those programs can complete the exemplary methods described herein.

According to one embodiment, program 204 is stored within the mobile device 200; information can be inputted into program 204 via the mobile device 200 and/or vehicle 100; and information can be outputted from program 204 via the display of vehicle infotainment system 102 (e.g., via Apple CarPlay, Android Auto or other connection). According to another embodiment, program 104 is stored within the vehicle infotainment system 102; information can be inputted into program 104 via the touchscreen display 114 of vehicle infotainment system 102; and information can be outputted from program 104 via the display of vehicle infotainment system 102 (e.g., via Apple CarPlay or Android Auto).

According to yet another embodiment, program 204 is stored within the mobile device 200; information can be inputted into program 204 via the display of mobile device 200; and information can be outputted from program 204 via both the display of mobile device 200 and the display of vehicle infotainment system 102. According to still another embodiment, program 204 is a mobile application stored within the mobile device 200; information can be inputted into program 204 via the display of mobile device 200; and information can be outputted from program 204 via the display of mobile device 200.

In certain embodiments, users of the vehicle 100 may be identified by program 104 based on paired device data maintained in the memory 112 of program 104. The paired device data can indicate, for example, unique device identifiers of mobile devices that were previously paired with program 104 of the vehicle 100, such that program 104 may automatically reconnect previously connected mobile devices without user intervention.

Programs 104, 204 are configured to interact with an AI chatbot model, such as ChatGPT, for example, which can run as a third-party software application (e.g., "app") on vehicle infotainment system 102 or on the mobile device 200. In other embodiments, the AI model can be a different AI-enabled software application running on vehicle infotainment system 102 or on the mobile device 200. Programs 104, 204 can be configured to interact with the AI model or ChatGPT app and use ChatGPT's API to perform an action (e.g., query) specified by the program(s). As another alternative, programs 104, 204 may include a built-in AI chatbot model. Further details of the AI model are described in U.S. patent application Ser. No. 18/201,799 filed on May 25, 2023, which is incorporated by reference herein in its entirety and for all purposes.

Programs 104, 204 can be configured to connect directly to the network of the vehicle 100 and/or a third-party software applications (e.g., other "apps") or devices via a direct connection application programming interface (API). Programs 104, 204 can be configured to interact with other apps installed on vehicle infotainment system 102 or mobile device 200, such as different apps for social media, messaging, maps and navigation, music or podcasts, etc., that may be installed on, and be available via the display of, vehicle infotainment system 102 (e.g., via Apple CarPlay or Android Auto), for example, or with other similar apps installed on mobile device 200.

In certain embodiments, programs 104, 204 can appear as a selectable icon within Apple CarPlay or mobile device 200. Programs 104, 204 can be configured to connect the network of the vehicle 100 with the Apple ecosystem (e.g., with the different Apple devices, such as iPhone, iPad, MacBook, Apple Watch, AirPods, Apple TV, Apple CarPlay, etc.) that may be connected and integrated with each other, and that may be accessible within the vehicle 100. Once connected to the Apple ecosystem, programs 104, 204 can run in the background of Apple CarPlay, for example.

Turning now to different ways to collect the vehicle-related data, user-related data and/or other data, those sources of data can originate from the vehicle itself, infotainment system 102 or apps that are associated with the system 102, and/or mobile device 200 or apps that are associated with the mobile device 200.

The vehicle 100 can include a vehicle controller area network ("CAN") including a CAN bus 120. The CAN bus 120 may be connected to the infotainment system 102 and/or mobile device 200 for exchanging data therewith. By way of non-limiting example, the following vehicle-related information may be communicated via CAN bus 120 to programs 104 and/or 204: vehicle speed, vehicle gear selection, longitudinal acceleration, lateral acceleration, driving mode (e.g., sport or normal), presence or absence of passengers (based, e.g., on seat sensors), traffic (e.g., number of times vehicle accelerates or decelerates over a pre-determined distance or the number of times the brakes are applied over a pre-determined distance), etc. Thus, the programs 104 and 204 can monitor and collect the above-described vehicle-related information provided by CAN bus 120.

Without the aid of a CAN bus 120 or mobile device 200, the program 104 may itself be configured to monitor and collect at least the following vehicle-related information from the infotainment system 102 or apps that are associated with the system 102: traffic (based on GPS program, navigation app or traffic app), geographic location of vehicle (based on GPS program, navigation app or traffic app), destination of vehicle (based on GPS program, navigation app or traffic app), speed (based on GPS program), acceleration, driving style (e.g., current vehicle speed vs. speed limit posted to traffic app, or number of times vehicle decelerates over a pre-determined distance), audio volume level, interior temperature, etc. The infotainment system 102 may itself be configured to monitor and collect at least the following additional information that is unrelated to functioning of the vehicle: music selection (e.g., last song(s) played), music selection preferences, local weather in a vicinity of the vehicle (e.g., based on vehicle location (e.g., city, town, etc.)), outside temperature, date, day, month, time, etc.

Without the aid of CAN bus 120 or infotainment system 102, mobile device 200 may be utilized for detecting and collecting the above-described vehicle-related information and passing that information on to the programs 104, 204. More particularly, the mobile device 200 has sensors, such as accelerometers and GPS, as well as the apps and general means for detecting at least the following vehicle-related information: vehicle speed, longitudinal acceleration, lateral acceleration, traffic (based on GPS program, navigation app or traffic app), geographic location of vehicle (based on GPS program, navigation app or traffic app), destination of vehicle (based on GPS program, navigation app or traffic app), audio volume level (via microphone 218), interior temperature, existence of passengers (based, e.g., on phone signals), driving style (e.g., current vehicle speed vs. speed limit posted to traffic app, acceleration, deceleration, etc.), etc. The mobile device 200 may also include sensors and/or programming to monitor and collect at least the following additional information that is unrelated to functioning of the vehicle and passing that information on to the programs 104, 204: music selection (e.g., last song(s) played), music selection preferences set by the user of the vehicle, outside temperature, weather (e.g., precipitation), date, month, time, etc.

Turning now to an exemplary method of automatically selecting music to be played within the passenger compartment of the vehicle based on the aforementioned vehicle-related and "additional" information, the user launches computer program(s) 104 and/or 204. If not already established, the computer program 104 and/or 204 establishes a connection with a server via receivers/transmitters 106, 206. Programs 104 and/or 204 compile the aforementioned vehicle-related and "additional" information. It is noted that the user may (optionally) use the touchscreen of either vehicle 100 or mobile device 200 to input preferred music genres (e.g, pop music, country music, classical music, etc.) such that only music associated with a preferred music genre is played by the system 102. Such a step would limit the music genres played by programs 104, 204.

Thereafter, the preferred music genre along with the aforementioned vehicle-related and "additional" information is then output as a query by the program(s) 104, 204 to an AI program (e.g., ChatGPT app) as input data, and the AI program generates output in the form of (i) a suggested song to play based upon the input data, and (optionally) (ii) a statement providing rationale for playing the suggested song. By way of example, on a sunny day (as detected by a weather app) while the vehicle is located near a beach (as detected by a traffic app) and while the vehicle is travelling a high rate of speed (as detected by either an in-vehicle sensor or a traffic app in the mobile device) with the audio volume set to a high level, the AI program could suggest a high-tempo Beach Boys song to match the suggested music genre, weather, speed, volume, etc. and, more generally, to match the environment or perceived mood of the driver.

Once the suggested song is received from the AI program, the computer program 104 and/or 204 instructs a separate music player program (e.g., Apple Music) to play the suggested song, which causes the infotainment system 102 to play the suggested song over the speakers 117. The music player program may be loaded on the system 102 or mobile device 200. Alternatively, the programs could prompt the user for approval to play the suggested song over the speakers 117. Using the display 114 and/or speakers 117, the computer program 104 and/or 204 may also produce the above-described rationale statement either in the written form using the display 114 or in verbal form using the speakers 117. As noted above, the rationale statement provides the rationale for playing the suggested song. The lyrics of the song may also be displayed over the display of the system 102 or mobile device 200.

The AI program will continue to suggest songs to be played over the system 102 while monitoring any changes in the data and avoiding repeated songs, and the system 102 will continue to play the songs suggested by the AI program.

If desired, the system 102 may also adjust the ambient light within the car based on the music playing as described in U.S. patent application Ser. No. 18/444,866, which is incorporated by reference herein in its entirety. The system 102 may also control other vehicle systems based on artificial intelligence such as, but not limited to, communications/messaging to the driver/passenger, cabin temperature, lighting, audio/video, audio volume, navigation or any other features affecting the driver/passenger experience.

Referring still to the exemplary method, the method may be characterized as a computer-implemented method for automatically selecting songs to be played within a vehicle without user intervention during operation of the vehicle based on an environment or a perceived mood of the user, said method comprising the steps of:

(a) capturing data using a software application, said data including (i) vehicle-related information including current vehicle speed, and (ii) music preferences of the user of the vehicle;

(b) transmitting, by the software application, said data to an artificial intelligence (AI) program;

(c) querying, by the software application, the AI program for a suggested song based on said data;

(d) receiving, by the software application, the suggested song from the AI program; and (e) instructing, by the software application, a music player program to play the suggested song over a speaker system of the vehicle.

Step (a) involves capturing data. The capture of data could involve collecting, analyzing, mirroring, or reproducing data, for example. Step (b) involves the transmission of data, and such transmission could be between two different apps or programs, or the transmission could be an intra-program transmission of data. The AI program could form part of the software application. Similarly, for step (e), the music player program could form part of the software application. For step (c), the query could be a string of text, natural language text, instructions, data or numbers that is/are forwarded to the AI program.

In the context of the present description, the functions of the programs may be carried out by a computer processor. The computer processor can be understood to mean a machine or an electronic circuit, for example. In particular, a processor can be a central processing unit (CPU), a microprocessor or microcontroller, for example an application-specific integrated circuit or digital signal processor, possibly in combination with a data storage unit for storing program commands, etc. Additionally, a processor can be understood to be a virtual processor, a virtual machine or soft CPU. The programs may be stored in the memory of the machine.

It will be understood that the operational steps are performed by the computers or processors described herein upon loading and executing software code or instructions which are tangibly stored on a tangible, non-transitory computer readable storage medium, such as on a magnetic medium, e.g., a computer hard drive, an optical medium, e.g., an optical disc, solid-state memory, e.g., flash memory, or other storage media known in the art. Thus, any of the functionality performed by the computers or processors described herein described herein is implemented in software code or instructions which are tangibly stored on a tangible, non-transitory computer readable storage medium. Upon loading and executing such software code or instructions by the computers or processors, the computers or processors may perform any of the functionality of the computers or processors described herein, including any steps of the methods described herein.

The term "software code" or "code" used herein refers to any instructions or set of instructions that influence the operation of computers or processors. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

It will also be understood that the terms and expressions used herein have the ordinary meaning as is accorded to such terms and expressions with respect to their corresponding respective areas of inquiry and study except where specific meanings have otherwise been set forth herein. The terms "comprises," "comprising," "includes," "including," or any other variation thereof, are intended to cover a non-exclusive inclusion, such that a process, method, article, or apparatus that has, comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A computer-implemented method for automatically selecting songs to be played within a vehicle without user intervention during operation of the vehicle based on an environment or a perceived mood of the user, said method comprising the steps of:
   (a) capturing data using a software application, said data including (i) vehicle-related information including current vehicle speed, and (ii) user-related information including music preferences of the user of the vehicle;
   (b) transmitting, by the software application, said data to an artificial intelligence (AI) program;
   (c) querying, by the software application, the AI program for a suggested song based on said data;
   (d) receiving, by the software application, the suggested song from the AI program; and
   (e) instructing, by the software application, a music player program to play the suggested song over a speaker system of the vehicle.

2. The computer-implemented method of claim 1, wherein prior to step (a), the method further comprises the step of connecting the software application to a network.

3. The computer-implemented method of claim 1, wherein the vehicle-related information also includes a gear selection of the vehicle, a longitudinal acceleration of the vehicle, a lateral acceleration of the vehicle, and a driving mode selected by the user of the vehicle.

4. The computer-implemented method of claim 1, wherein the data also includes a presence or absence of a vehicle passenger.

5. The computer-implemented method of claim 1, wherein said data includes a traffic condition in a vicinity of the vehicle.

6. The computer-implemented method of claim 5, wherein the traffic condition is estimated based upon (i) a number of times the vehicle either accelerates or decelerates over a pre-determined distance or a number of times a brake of the vehicle is applied over the pre-determined distance, or (ii) data received from a separate traffic program.

7. The computer-implemented method of claim 1, wherein said data includes a weather condition in a vicinity of the vehicle.

8. The computer-implemented method of claim 1, wherein said data includes outside temperature in a vicinity of the vehicle.

9. The computer-implemented method of claim 1, wherein step (b) comprises forwarding the data in the form of a natural language text string to the AI program.

10. The computer-implemented method of claim 1, further comprising the step (f) of displaying a statement providing a reason as to why the suggested song was selected by the AI program.

11. The computer-implemented method of claim 1, wherein the software application is loaded on a mobile device that is connected to the vehicle, and wherein the music player program and the software application are separate applications stored on the mobile device that operate concurrently.

12. The computer-implemented method of claim 1, wherein the software application is loaded on an infotainment system of the vehicle.

13. The computer-implemented method of claim 1, wherein said data includes traffic, geographic location of the vehicle, speed of the vehicle, audio volume level, weather and time of year, and wherein step (b) comprises forwarding the data to the AI program.

14. The computer-implemented method of claim 1, wherein said music preferences are based on one or more preferred music genres input by the user using the software application.

15. A computer program product for automatically selecting songs to be played within a vehicle without user intervention during operation of the vehicle based on an environment or a perceived mood of the user, the computer program product being stored in a non-transitory computer-readable recording medium, wherein the computer program product is configured for:
   (a) capturing data using a software application, said data including (i) vehicle-related information including current vehicle speed, and (ii) user-related information including music preferences of the user of the vehicle;
   (b) transmitting, by the software application, said data to an artificial intelligence (AI) program;
   (c) querying, by the software application, the AI program for a suggested song based on said data;
   (d) receiving, by the software application, the suggested song from the AI program; and
   (e) instructing, by the software application, a music player program to play the suggested song over a speaker system of the vehicle.

16. A vehicle comprising the computer program product of claim 15.

17. A smartphone comprising the computer program product of claim 15, and wherein the music player program and the software application are separate applications stored on the smartphone that operate concurrently.

18. The computer program product of claim 15, wherein the vehicle-related information also includes a gear selection of the vehicle, a longitudinal acceleration of the vehicle, a lateral acceleration of the vehicle, and a driving mode selected by the user of the vehicle.

19. The computer program product of claim 15, wherein said data includes traffic, geographic location of the vehicle, speed of the vehicle, audio volume level, weather and time of year, and wherein step (b) comprises forwarding the data to the AI program.

20. The computer program product of claim 15, wherein said music preferences are based on one or more preferred music genres input by the user using the software application.

* * * * *